United States Patent
Stütz et al.

(10) Patent No.: US 6,609,726 B1
(45) Date of Patent: Aug. 26, 2003

(54) GAS GENERATOR ASSEMBLY AND GAS BAG

(75) Inventors: Michael Stütz, Spraitbach (DE); Hartmut Wölke, Alfdorf (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/601,781

(22) PCT Filed: Dec. 15, 1998

(86) PCT No.: PCT/EP98/08212

§ 371 (c)(1), (2), (4) Date: Aug. 7, 2000

(87) PCT Pub. No.: WO99/42335

PCT Pub. Date: Aug. 26, 1999

(30) Foreign Application Priority Data

Feb. 19, 1998 (DE) .................. 298 02 925 U

(51) Int. Cl.⁷ .............................. B60R 21/16
(52) U.S. Cl. ................................ 280/743.1
(58) Field of Search ............ 280/730.1, 730.2, 280/740

(56) References Cited

U.S. PATENT DOCUMENTS

| | | | |
|---|---|---|---|
| 4,223,916 A | | 9/1980 | Tillac |
| 5,390,953 A | * | 2/1995 | Tanaka et al. ............ 280/733 |
| 5,474,326 A | * | 12/1995 | Cho ...................... 280/733 |
| 5,605,346 A | | 2/1997 | Cheung et al. |
| 5,851,055 A | * | 12/1998 | Lewis ..................... 297/483 |
| RE36,587 E | * | 2/2000 | Tanaka et al. ............ 280/733 |
| 6,082,761 A | * | 7/2000 | Kato et al. .............. 280/730.2 |
| 6,126,194 A | * | 10/2000 | Yaniv et al. ............. 280/733 |
| 6,145,876 A | * | 11/2000 | Hamilton ................. 280/736 |
| 6,155,594 A | * | 12/2000 | Ibe et al. ............... 280/728.2 |
| 6,234,515 B1 | * | 5/2001 | Iwanaga ................. 280/728.2 |
| 6,237,941 B1 | * | 5/2001 | Bailey et al. ........... 280/730.2 |
| 6,244,621 B1 | * | 6/2001 | Kameyoshi et al. ....... 280/733 |

FOREIGN PATENT DOCUMENTS

| | | |
|---|---|---|
| DE | 19603703 | 8/1997 |
| DE | 19712039 | 11/1997 |
| DE | 19629541 | 1/1998 |
| DE | 19700759 | 1/1998 |
| DE | 29716793 | 3/1998 |
| EP | 0650871 | 5/1995 |

\* cited by examiner

*Primary Examiner*—Lesley D. Morris
*Assistant Examiner*—Paul Royal, Jr.
(74) *Attorney, Agent, or Firm*—Tarolli, Sundheim, Covell & Tummino L.L.P.

(57) ABSTRACT

An assembly comprising an inflator (10) and an elongated gas bag (14) in fluid communication therewith, said gas bag (14) being transferable from a space-saving folded condition into a deployed condition by compressed gas made available when required by said inflator (10), is characterized in that a flexible, compression-resistant space keeper (16) is provided in the interior of said gas bag (14) which provides a flow path for the compressed gas in the interior of said gas bag (14) whilst at the same time permitting folding of said gas bag (14).

3 Claims, 1 Drawing Sheet

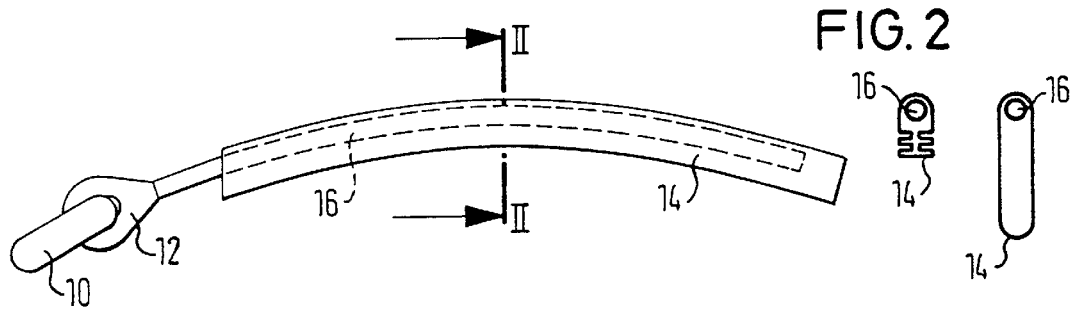
FIG. 1  FIG. 2  FIG. 3
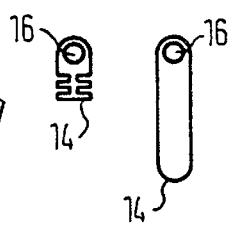
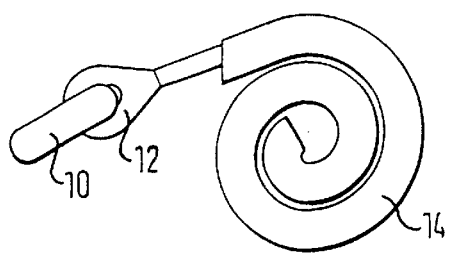
FIG. 4

GAS GENERATOR ASSEMBLY AND GAS BAG

The invention relates to an assembly comprising an inflator and an elongated gas bag in fluid communication therewith, the gas bag being transferable from a space-saving folded condition into a deployed condition by compressed gas made available when required by the inflator.

Such an elongated gas bag is used in particular as a head gas bag in motor vehicles. There are currently two concepts for distributing the compressed gas made available when required by the inflator in the interior of the gas bag. In a first concept a flexible fabric hose having gas exit ports is provided in the interior of the gas bag. The drawback of this configuration is that the walls of the fabric hose lie flatly on top of each other when the gas bag is in its folded condition so that the compressed gas introduced from one side into the fabric hose first needs to expand the fabric hose before it can flow therethrough. This results in an increase in the time needed to deploy the gas bag. The advantage of this configuration is that the gas bag can be folded in practically any way since the fabric hose is not a disturbance thereto. A second concept provides for arranging a deflection-resistant tube, a so-called gas lance, in the interior of the gas bag. This gas lance is provided with gas exit ports through which the compressed gas is able to flow into the interior of the gas bag. The advantage of this configuration is that the gas bag can be deployed very quickly since the flow path in the interior of the gas lance continues to exist even when the gas bag is folded. The drawback of this configuration is that the rigid gas lance is a nuisance to the handling and folding of the gas bag.

The invention provides an assembly of inflator and gas bag which combines the advantages of both concepts as cited. In accordance with the invention it is provided for in an assembly of the aforementioned kind that a flexible, compression-resistant space keeper is provided in the interior of the gas bag which provides a flow path for the compressed gas in the interior of the gas bag whilst at the same time permitting folding of the gas bag. In this way a free flow path exists even when the gas bag is folded, the compressed gas being able to flow into the gas bag through this flow path without detriment.

A preferred embodiment of the invention reads from the sub-claim.

The invention will now be described on the basis of a preferred embodiment with reference to the drawings in which FIG. 1 is a schematic side view of an assembly in accordance with the invention, the gas bag being shown in the space-saving folded condition;

FIG. 2 is section taken along the plane II—II as shown in FIG. 1;

FIG. 3 is a view corresponding to that of FIG. 2, in which, however, the gas bag is in the deployed condition;

FIG. 4 is a schematic side view of an assembly in accordance with the invention in which the gas bag together with the space keeper is spirally wound up.

Referring now to FIG. 1 there is illustrated an assembly in accordance with the invention. This assembly comprises an inflator 10 which is in fluid communication with a gas bag 14 by means of a housing 12 indicated schematically. Connected to the housing 12 is a space keeper 16 which is, on the one hand, flexible and on the other compression-resistant. The space keeper 16 may be more particularly a coil spring. A space keeper which is simultaneously flexible and compression-resistant is in this context understood to be an element which at most is compressible only slightly by a pressure applied from without, more particularly in radial direction, so that the free inner cross-section substantially continues to exist whilst simultaneously permitting deformation of the space keeper from an elongated configuration, for example.

Referring now to FIG. 2 there is illustrated the assembly as shown in FIG. 1 in cross-section with the gas bag folded space-savingly. It is evident that the space keeper 16 keeps free a flow path in the interior of the gas bag 14 through which compressed gas generated in the inflator 10 when required flows longitudinally into the folded gas bag enabling it to be transferred into a deployed condition. This condition is shown in FIG. 3.

Referring now to FIG. 4 there is illustrated the assembly in accordance with the invention with the gas bag folded space-savingly, with the folded gas bag together with the space keeper 16 contained therein being rolled up spirally. Unlike the gas lance known hitherto, which is rigid and is thus a nuisance to handling an assembly of inflator and gas bag, both in transportation and fitting, the gas bag 14 in the case of the assembly in accordance with the invention can be rolled up due to the flexibility of the space keeper in many different ways or otherwise be transferred into a compact configuration for the purpose of transportation, handling or fitting.

What is claimed is:

1. An assembly comprising an inflator (10) and an elongated gas bag (14) in fluid communication therewith, said gas bag (14) being transferable from a space-saving folded condition into a deployed condition by compressed gas made available when required by said inflator (10), characterized in that a flexible, compression-resistant space keeper (16) is provided in the interior of said gas bag (14) which permits folding of said gas bag (14) and provides a flow path for the compressed gas in the interior of the gas bag, said space keeper being a coil spring.

2. An assembly comprising an inflator (10) for providing inflation fluid and an elongated gas bag (14) inflatable by said inflation fluid, said gas bag (14) being transferable from a space-saving folded condition into a deployed condition by compressed gas made available when required by said inflator (10), characterized in that a flexible, compression-resistant space keeper (16) is provided in the interior of said gas bag (14) which permits folding of said gas bag (14) and, in conjunction with said gas bag, provides a flow path for the compressed gas in the interior of the gas bag, said space keeper being a coil spring.

3. The assembly according to claim 2 wherein said coil spring is compressible only slightly by a pressure applied in a radial direction so that a free inner cross-section continues to exist while permitting deformation of said coil spring from an elongated condition to a spiral folded condition.

* * * * *